US007568618B1

(12) United States Patent
Scutellaro et al.

(10) Patent No.: US 7,568,618 B1
(45) Date of Patent: Aug. 4, 2009

(54) AUTOMATED FOOD SERVICE AND BILLING SYSTEM AND METHOD

(75) Inventors: Joseph F. Scutellaro, Brick, NJ (US); Steven R. Baker, Windermere, FL (US); Robert A. Baydale, Windermere, FL (US); Norman L. Norris, Birchrunville, PA (US); Louis Pecci, Jacksonville, FL (US)

(73) Assignee: GFC Automat, Inc., Toms River, NJ (US)

( * ) Notice: Subject to any disclaimer, the term of this patent is extended or adjusted under 35 U.S.C. 154(b) by 336 days.

(21) Appl. No.: 11/364,690

(22) Filed: Feb. 27, 2006

Related U.S. Application Data

(60) Provisional application No. 60/657,493, filed on Mar. 1, 2005.

(51) Int. Cl.
*G06K 15/00* (2006.01)

(52) U.S. Cl. ....................... 235/383; 235/381; 235/385; 221/2

(58) Field of Classification Search ................. 235/381, 235/383, 385; 221/1, 2; 186/36–39
See application file for complete search history.

(56) References Cited

U.S. PATENT DOCUMENTS

| | | | | |
|---|---|---|---|---|
| 5,499,707 | A * | 3/1996 | Steury | 194/217 |
| 6,102,162 | A * | 8/2000 | Teicher | 186/39 |
| 7,093,755 | B2 * | 8/2006 | Jordan et al. | 235/385 |
| 7,114,650 | B2 * | 10/2006 | Sherrod | 235/381 |

OTHER PUBLICATIONS

Diehl, L.B. and Hardart, M., "The Automat—The History, Recipes, and Allure of Horn & Hardart's Masterpiece", Nov. 2002, Clarkson Potter/Publishers, New York, Entire Book. Also on the web at http://www.theautomat.net, 128 pages.

* cited by examiner

*Primary Examiner*—Seung H Lee
(74) *Attorney, Agent, or Firm*—Woodcock Washburn LLP

(57) ABSTRACT

An automated food dispensing and billing system has an array of food enclosures, each for dispensing food to a customer. In response to the detection of a signal from a customer authorization device, the enclosure may be accessed to retrieve the food item therein. A billing subsystem automatically charges an account associated with the customer authorization device.

15 Claims, 5 Drawing Sheets

AUTOMATED FOOD SERVICE AND BILLING SYSTEM AND METHOD

CROSS-REFERENCE TO RELATED APPLICATIONS

This application claims the benefit of priority of U.S. Provisional Patent Application No. 60/657,493, filed Mar. 1, 2005.

FIELD OF INVENTION

This invention relates generally to systems and methods for serving food to customers, and, more particularly, to systems and methods for ordering, preparing and delivering food to customers in a restaurant setting.

BACKGROUND OF THE INVENTION

Restaurants are increasingly faced with the challenge of serving the very best foods in a very short time frame to meet the needs of the consuming public. In addition, there is often the need to serve large numbers of people in high traffic areas in a cost effective manner.

In the early part of the last century, a concept was introduced to the restaurant industry called "The Automat". These restaurants which appeared in the New York City and Philadelphia area were capable of serving food, which by the standards of the day, was considered very good. Perhaps more importantly, these restaurants were capable of serving food in relatively short time frames to large numbers of people in busy metropolitan areas. To achieve these objectives, "The Automat" restaurants of that era employed small enclosures with glass doors where food from the kitchen was delivered to the customers. The doors would only open when a customer inserted a coin in a slot thereby allowing the food to be retrieved from the enclosure.

While "The Automat" restaurant of its day was considered state of the art, aspects of the food delivery system would be considered antiquated by today's standards. First, current health laws do not permit heated food to stand for any length of time before serving. It would therefore be impossible to deliver hot food to an enclosure for an indeterminate period of time before a patron inserts his or her nickel to retrieve the food from the enclosure. Second, the use of coins would be cumbersome given the cost of food as compared with the low value of coinage today. Third, while the old "Automat" restaurants did serve food expeditiously for the time, today's world operates at a much faster pace, especially in high traffic areas.

Yet, the basic concept of delivering high quality food to restaurant patrons from small enclosures in high traffic areas remains appealing today if health law issues, payment/currency issues and speed of delivery issues could somehow be addressed.

SUMMARY OF THE INVENTION

In accordance with one aspect of the invention, a method of operating a restaurant comprises the step of providing an array of enclosures for serving food to customers, each of the enclosures having a food supply opening through which food is inserted into the enclosure from a food production area and a customer access opening and closure therefore through which a customer can access the food in the enclosure after the enclosure is opened. A receiving area for a customer authorization device corresponding to a customer account and a closure enabling system for each of the enclosures is provided so as to enable the closure of an enclosure to open when a customer authorization device is in communication with the receiving area and automatically bill the cost of the food to the customer account.

In one embodiment of the invention, the customer account is billed at the time the customer authorization device is in communication with the receiving area so as to permit the closure to be opened. In another embodiment of the invention, the customer account may be billed at the time the food in the enclosure is ordered at an ordering station which may take the form of a touch screen or other order entry device. In either embodiment, the customer account may also be billed by waiters who circulate through the dining area to take orders for additional food and place the customer authorization device in communication with a wireless device for billing the customer account.

In accordance with the disclosed embodiments of the invention, the customer authorization device may take various forms. The device may take the form of a card, a wand or any other shape and serve a credit or debit function. In the case of a debit device, the customer account is billed by debiting the debit device for the value of the food, and the debit device which may take the form of a debit card may be sold to a customer at the time of entering the restaurant. In the case of a credit device, the customer account represented by the credit device is charged for the value of the food. The credit device may comprise the customer's own preexisting credit card or a credit card issued by restaurant at the time the customer enters the restaurant. Where the credit device is issued by the restaurant, the amount of credit accumulated in the customers account may be stored on the credit device or at a central location in the restaurant in the memory of a CPU. In either case, the credit device is used to identify the account of the customer and the amount due and payable to the restaurant.

In one embodiment of the invention wherein food is ordered at an ordering station which may comprise a touch screen or other order entry device, an order signal is transmitted to the food production area to initiate delivery of the food ordered to at least one assigned enclosures. A confirmation signal is then transmitted from the food production area to a status board identifying which at least one enclosure will receive the food so as to advise the customer which at least one enclosure to open with the customer's authorization device. The confirmation signal may also provide an estimated time of arrival of the order at the at least one enclosure. Preferably, the order signal and the confirmation signal will include information for identifying the customer on the status board by number, name or otherwise. The closure may comprise a screen for displaying images of the food which the customer has ordered including, for example, sequential images showing the food in preparation. In another embodiment of the invention, an order signal is generated in response to each customer's food order so as to indicate the resulting depletion of inventory at the enclosure containing the food ordered by the customer. This signal is transmitted to the food preparation area so as to enable the proper inventory to be maintained and the appropriate enclosures to be restocked. The order signal may be generated at an order station in response to customer's entry of an order or at the enclosure in response to the receiving area receiving a customer authorization device and/or the opening of the closure to the enclosure by the customer.

BRIEF DESCRIPTION OF THE DRAWINGS

The foregoing summary as well as the following detailed description of preferred embodiments of the invention will be better understood when read in conjunction with the appended drawings.

DETAILED DESCRIPTION OF PREFERRED EMBODIMENTS

Figure 1:
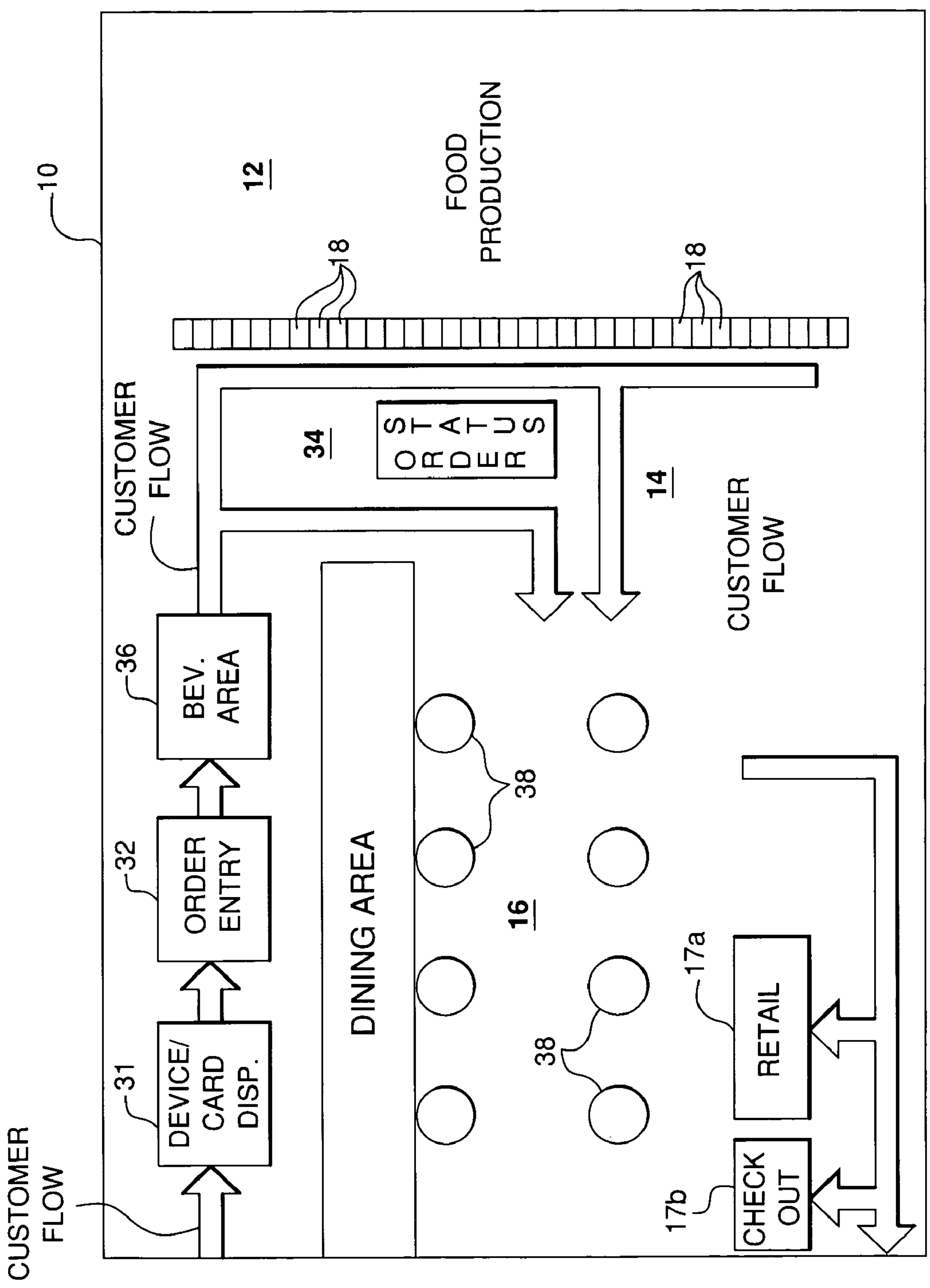
FIG. 1 is a plan view of a restaurant including a schematic representation of customer flow through various areas in the restaurant.

As shown in FIG. 1, a restaurant 10 includes a kitchen or food production area 12, a customer food acquisition area 14, a customer dining area 16, a customer retail area 17*a* and a customer checkout area 17*b*. In accordance with one aspect of invention, the food acquisition area includes an array of food enclosures 18 for receiving food from the kitchen 12 which is inserted into the enclosures 18 through food supply openings and delivering food to the customers in the food acquisition area through customer access openings in the enclosures 18 as will now be described in greater detail with reference to FIGS. 4 and 5.

Figure 4:
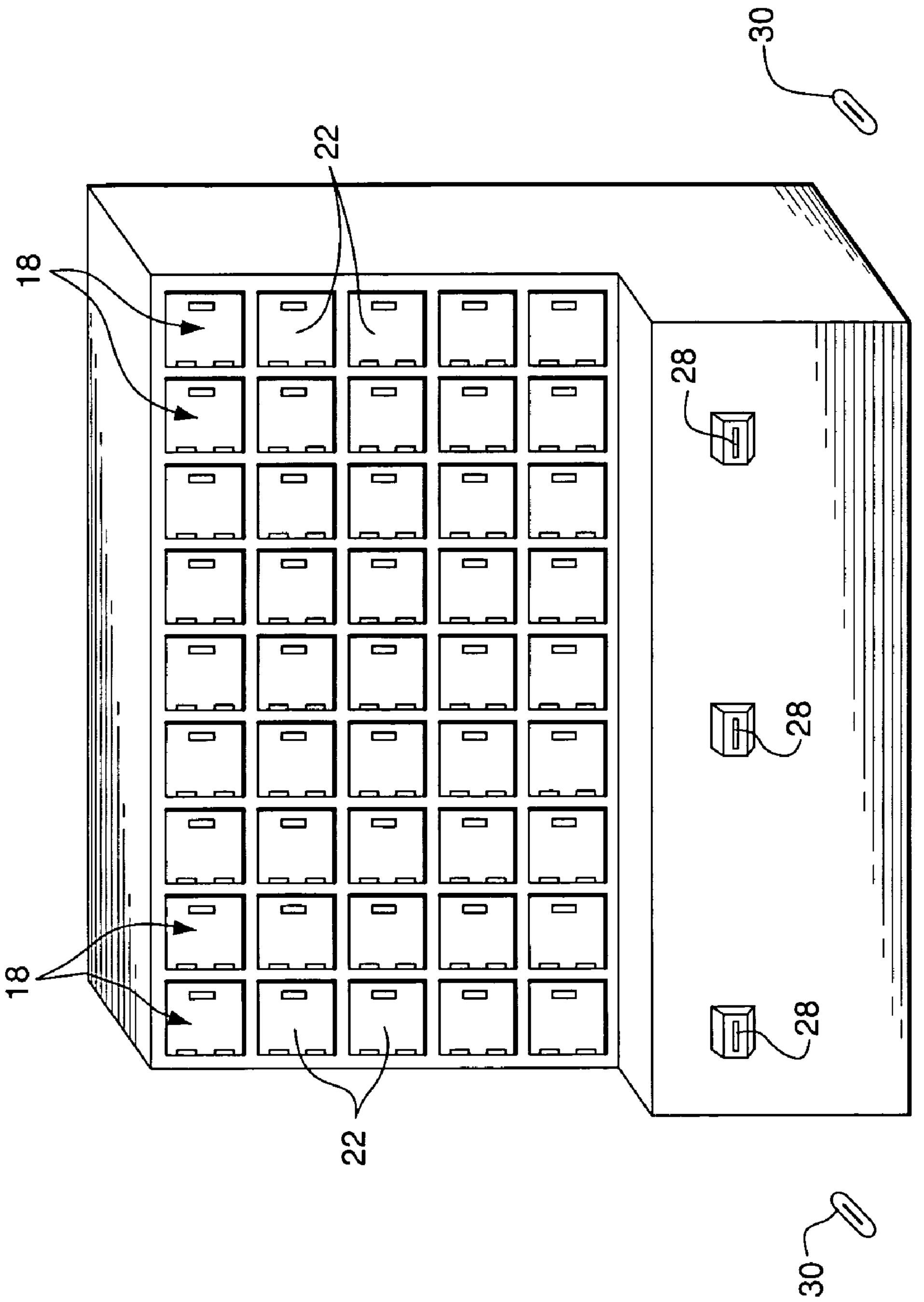
FIG. 4 is a three dimensional view of an array of food enclosures in which food is delivered to customers in accordance with an embodiment of the invention.
Figure 5:
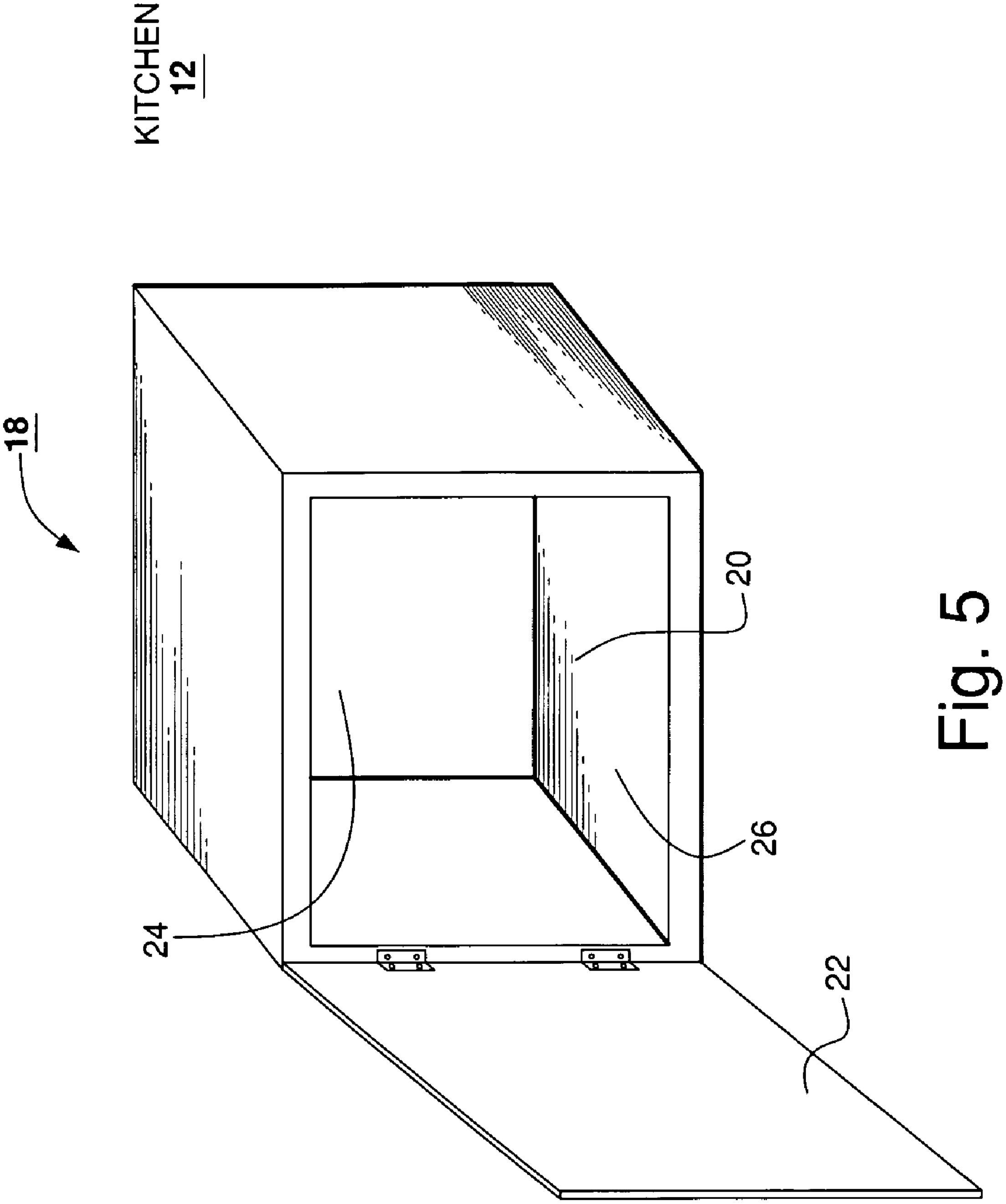
FIG. 5 is an enlarged three dimensional view of one of the enclosures of FIG. 4.

As shown in FIGS. 4 and 5, the array of enclosures 18 is arranged in rows and columns. Each enclosure 18 includes a food access opening 20 which is normally closed by a hinged closure 22 but shown in the open position in FIG. 5 so as to permit removal of the food by the customer. Prior to such removal and before of opening of the closure 22, the food is supplied from the kitchen 12 to the enclosure through a food supply opening 24 and placed on a shelf 26 at the base of the enclosure 18. In accordance with one aspect of the invention, the array of enclosures 18 includes an area shown as a card swipe slot 28 for receiving and communicating with a customer authorization device shown as a card 30 and activating a closure enabling system so as to allow the customer to open the closure 22 of the enclosure 18.

Figure 3:
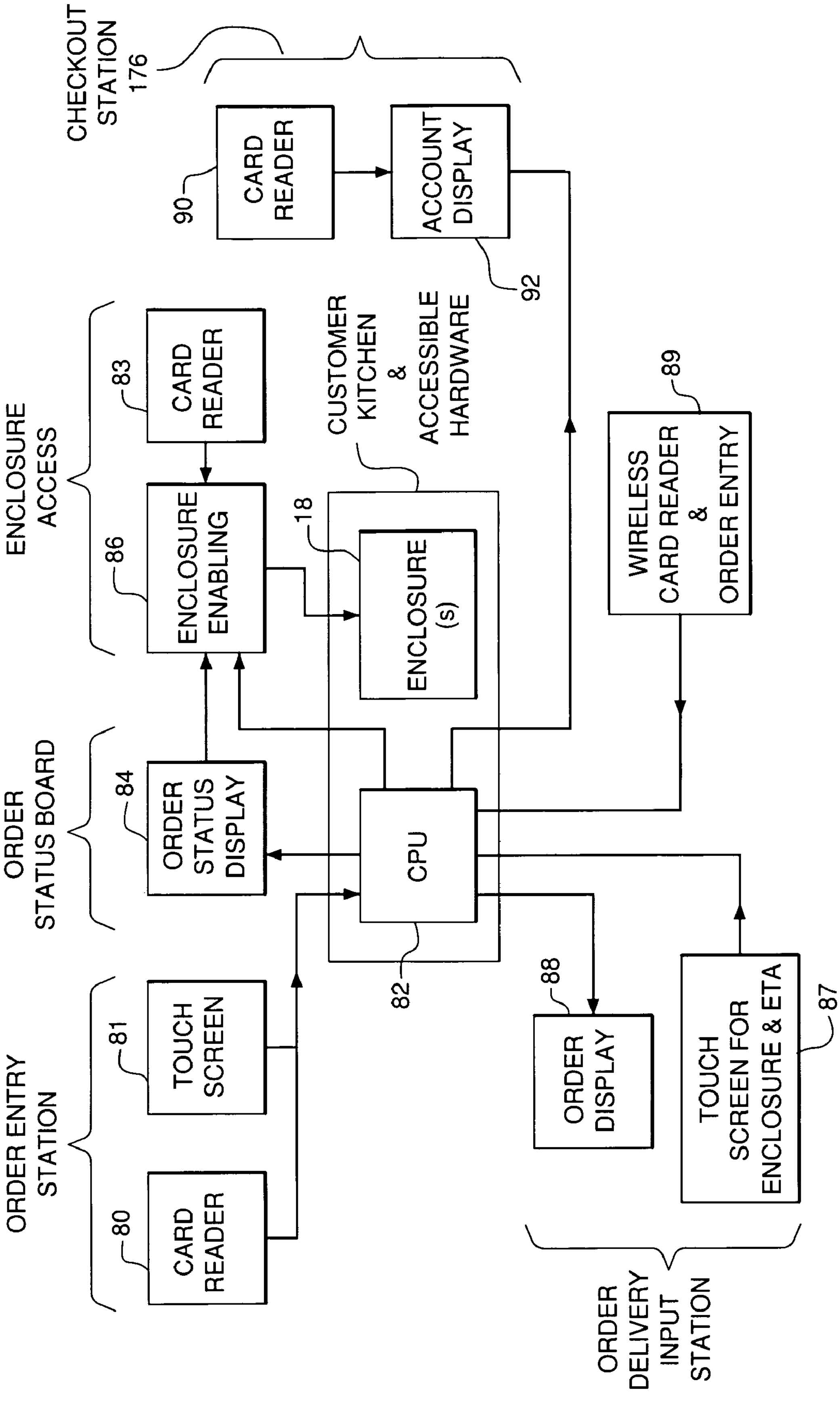
FIG. 3 block diagram of information technology system in the restaurant.

In accordance with one aspect of the invention, the closure 22 may compromise an LCD display which is viewable by the customer when the closure 22 is in the closed position. The display may be used for a variety of purposes including entertainment, images of the food in preparation, other information which may be of interest to the customer as well as advertising. The content of the visual display may be stored at a CPU as shown in FIG. 3 in the form of, for example, a CD.

With reference again to FIG. 1, the food acquisition area includes a station 31 for dispensing the customer authorization device or card 30 to the customer. As used in this embodiment of the invention, the card 30 is a restaurant credit card which is used by the customer during his or her visit to the restaurant. The customer first uses the card 30 at an order area or order entry board 32 which comprises an order entry system such as a touch screen. After the card 30 is read at the order board 32, the customer may enter his or her order using the touch screen and the card 30 is charged for the value of the food ordered. The customer then advances to a status area where the status of the customer order is displayed on a suitable display device such as a status board 34 comprising one or more LCD displays. The status board communicates with the order board through a CPU so as to enable the status board to display each order by identifying the customer using the identification on the card 30 (e.g. a number), a description of items ordered by the customer, identification of specific food enclosures which will receive the items ordered by the customer, and an estimated time of arrival of the items ordered at the food enclosures 18. Since the customer is kept advised of the status of his or her order by the status board 34, the customer is free to access his or her order at the array 16 as the items ordered are delivered to the appropriate enclosures 18.

While the customer awaits the delivery of any item to an enclosure 18, the customer is free to proceed to a beverage dispensing area 36. The beverage area 36 may be automated to the extent that the customer inserts his or her card in to a slot so that the card 30 can be charged for the value of the beverage automatically dispensed. The customer is also free to advance to the dining area 16 to locate a table 38 at which to dine. The customer can then return to the array of food enclosures 18 at the appropriate time to retrieve his or her order knowing that the item ordered is secure since the designated food enclosure cannot be opened without the customer's card 30. Although this embodiment has been described in terms of automatically billing the customer's credit card at the time of ordering at the order board 18, it is also possible that such automatic billing can occur at the time of accessing the food in an enclosure 18.

If a customer requires an additional food item during the course of the meal which has not previously been ordered at the order board 32, this can be accomplished by summoning a member of the wait staff who carries a wireless device for placing the customer's new order. The wireless device includes a card swipe slot for receiving the customer's card 30 so that the card can be appropriately charged. The food may be delivered by the wait staff or the customer may be advised by the wait staff of the particular enclosure 18 where the order will be delivered and the customer can then retrieve the order from that enclosure 18.

After the customer is through dining and all food ordered has been charged to his card or her card 30, the customer proceeds to the retail section 17*a* and the check out station 17*b*. Note that the retail section could include take out food but this is preferably made available in another area not shown so as eliminate take out traffic through the restaurant proper. The customer's card 30 is read at the check out station and the charges to the customer's card are displayed to the customer on a screen or by other suitable means. The customer then pays the displayed amount with cash, a third party credit card, a third party debit card or any other acceptable vehicle for payment which is acceptable to the restaurant.

The embodiment described above in connection with FIG. 1 employs a restaurant credit card. In another embodiment of the invention, the restaurant depicted in FIG. 1 could use third party credit and/or debit cards rather than restaurant credit cards which would eliminate the need for the card dispenser 31. In yet another embodiment of the invention, both restaurant credit cards and third party credit and/or debit cards could be used so as to provide the ability to pay by credit card or cash at the time of check out, in which case the card dispenser 31 will be required. In still another embodiment of the invention, the dispenser 31 can dispense debit cards which are purchased by the customer. The debit cards can be purchased in any amount and can be used by the customer in return visits to the restaurant and the check out station could be eliminated unless the restaurant also permitted the use of third party credit and/or debit cards for ordering and accessing the food in the enclosures 18.

In yet another embodiment of the invention, a bank of enclosures 18 may be provided which is constantly stocked with relatively nonperishable items which do not need to be made to order. For example, food items such as sandwiches and pastries can be stored for extended periods of time in room temperature enclosures 18 or enclosures 18 which are refrigerated. Such enclosures 18 may be constantly stocked so as to permit customers to bypass the order board 32 and the status board 34 and access the food in the enclosure by simply using the appropriate authorization device, e.g., a restaurant credit card or debit card dispensed from the card dispenser 31 or a third party credit card or debit card.

Figure 2:
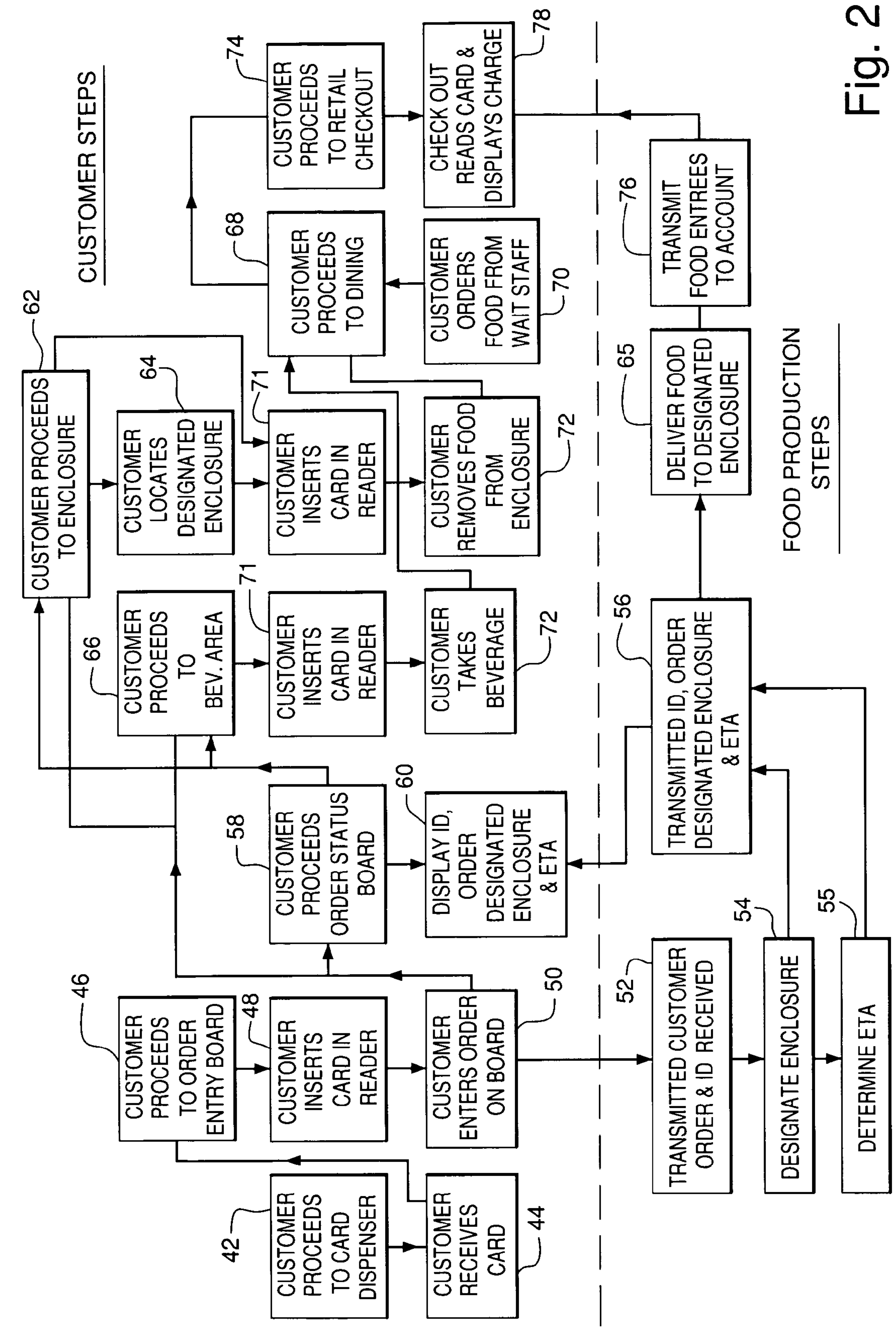
FIG. 2 is a flow chart of customer actions, kitchen actions and customer/kitchen interactions in the restaurant.

The invention will now be described with reference to the flow chart of FIG. 2 so as to show the interaction between the customer food acquisition area 14 and the food supply area 12 as the customer moves through the restaurant 10. After the customer enters the restaurant 10, the customer proceeds to the card dispenser (step 42) regardless of whether the card to be utilized is a credit card or a debit card. Of course, in the case of a debit card, the card will actually purchased at the dispenser 31. The customer then receives a card from the dispenser 31 (step 44).

The customer then proceeds to the order entry board 32 at the order station (step 46) and inserts his or her credit or debit card into a swipe slot (step 48) of a card reader so as to permit the customer to enter an order on a touch screen or other order entry device (step 50). A signal identifying the customer by card account and the food items ordered is then transmitted to the kitchen (step 52) where specific enclosures 18 for receiving each of the food items ordered by the customer are designated (step 54) and estimated times of arrival for those food items at the designated enclosures are determined (step 55).

A signal representing the designated enclosures 18 and the estimated time of arrival of the foods items along with customer identifying information is then transmitted to the status board 32 (step 56). Simultaneously, the customer proceeds to the status board 32 (step 58) and locates his or her displayed identification on the board 32 as well as the estimated time of arrival of the food items ordered at the designated enclosures 18 (step 60).

The customer is now free to go directly to the enclosures 18 (step 62) to access food which is continuously restocked by the kitchen in dedicated but undesignated enclosures or locate and go to designated enclosures 18 (step 64) where food is delivered in response to the customer's order (step 65). The customer is also free to proceed to the beverage area (step 66) or go directly to the dining area 16 (step 68) and return later to the designated enclosures for items ordered (step 70). Where a wait staff is provided to take subsequent orders on a wireless device, the customer may return to a designated enclosure to access such a subsequent order or ask the wait staff to deliver such an order. In both the beverage area and the food enclosure area, the customer inserts his or her credit card (step 71) and accesses the food or beverage (step 72).

After the customer has completed his or her dining experience, the customer proceeds to the retail and check out area (step 74). Before the customer reaches the checkout area, it is possible to provide access to a retail section selling food and/or other items which may be paid for at check out. Signals corresponding to the value of food ordered by the customer are transmitted from the kitchen (step 76) to the check out area so as to permit the customer to pay for the food ordered displayed at check out as well as well as any retail items selected (step 78).

It will be appreciated that where the card is a debit card, there is no need to transmit signals from the kitchen to the check out area since the debit card has been purchased in advance and the card itself carries the information concerning the status of the customer's account. The check out area merely provides the customer with yet another opportunity to use the value of the debit card purchased upon entering the restaurant.

Where a restaurant credit card is used, the card dispenser 31 shown in FIG. 1 comprises apparatus for encoding account identification information of the type well known in the art. This may be done by encoding a magnetic strip or using an optical encoding scheme such as a bar code where the encoding corresponds to human readable information such as a number which appears on the card so as to permit the customer to identify his or her order on the status board. Where a restaurant debit card is used, the dispenser 31 must also be capable of encoding a value on the card which may be modified as the value of the card is decremented while in use at the restaurant.

With reference to FIG. 3, the order entry station includes a card reader 80 of a type well known in the art which may, for example, comprise a device for magnetically reading a magnetic strip or optically reading an optical bar code when the card is inserted in a swipe slot at the order entry station. Insertion of the card in the slot permits the food ordered on a touch screen to be charged to the customer's account by transmitting a corresponding signal to a restaurant CPU 82 which stores each order and the value of the order under the customer's identification so as to permit retrieval of the information by the check out station 17*b*. Of course, where a debit card is used, such information need not be maintained at the CPU 82 since the value of the debit card will be debited each time it is used in the restaurant.

The CPU 82 also generates a signal designating an enclosure or enclosures to receive a customer's order(s) as well as the estimated time of arrival of the order(s) at the enclosure(s) 18 which is transmitted to an LCD display 84 at the order status board. This signal in combination with an enabling signal from the card reader 85 which is also supplied to a closure enabling mechanism 86 permits the customer to gain access to the food within the enclosure by enabling the customer to open the door 22 of the enclosure 18. The enabling mechanism 86 may control an electromagnetically actuated latch. The designated enclosure(s) and the estimated time of arrival of the order(s) may be generated automatically by the CPU 82 or manually by use of a touch screen 87 in the kitchen or food supply area 12 in response to the information appearing on the order display screen 88 after manually estimating the time for delivery and designating the enclosure(s) from an inventory of undesignated enclosures. The CPU 82 may also receive signals from card reader 85 at a bank of dedicated enclosures for food items that are continually restocked by the food supply area so as to provide ready access to customers without ordering at the order board 32. Such signals advise the CPU of the charge to a customer's account as well as advising the food supply area of the need to restock and/or create an inventory of such items so as to assure that the customers always have ready access to such food items.

It is also desirable to provide a wait staff in the dining area with a portable wireless order entry terminals 89 which includes a card swipe slot so as to appropriately charge or debit the customer's account for the food item(s) ordered from the dining area. As noted above, these food items can be delivered to the table of the customer by the wait staff or to an enclosure 18 designated by the CPU 82 which may also appear on the LCD display of the status board. A card reader 90 and the CPU 82 provide a signal to the account display 92 so as to advise the customer of the amount due on the customer's account.

Although the customer authorization device described has been referred to as a restaurant credit or debit card, it will be appreciated that the device may take other forms including but not limited to wand of the type used at gasoline pumps. It is only necessary that the device identify the customer's account when received at the ordering station, the food enclosures, the wireless wait staff devices and the check out area, and in the case of a debit device, be capable of being encoded with a value that may be debited as the device is used in the restaurant.

It will be appreciated that various aspects of the invention may be accomplished in a completely automated way, a partially automated way or manually. For example, production, supply and delivery of the food may be accomplished robotically or with a robotic and manual combination or entirely manually.

Various aspects of the invention have been described in terms of a restaurant. In using the word restaurant, it is not intended to limit the invention to a stand alone restaurant. Rather, any facility which includes dining for patrons could embody the invention including, but without limitation, casinos, theme parks, hotels and transportation terminals.

While the invention is susceptible to various modifications and alternative constructions, certain illustrated embodiments have been shown in the drawings and accompanying detailed description. It should be understood, however that there is no intention to limit the invention to the specific construction disclosed herein. On the contrary, the invention is intended to cover all modifications, alternative constructions, and equivalents falling within the scope and spirit of the invention.

What is claimed is:

1. A method of serving and billing for food, comprising:
- providing an array of enclosures for housing food to be served, each of the enclosures having a food supply opening through which food is inserted into the enclosure from a food supply area, and a customer access opening and closure therefore through which a customer can access the food in the enclosure after the closure is opened;
- providing a customer ordering location for at least one food item for ordering food using a customer authorization device corresponding to a customer account;
- generating a customer order signal at the customer ordering location representing the at least one food item ordered by a customer and the customer authorization device;
- providing a receiving area at said array for said customer authorization device;
- providing a closure enabling system for each of said closures;
- indicating the customer which of the enclosures will contain the customer's order;
- generating an enabling signal when a customer authorization device is in communication with said receiving area;
- transmitting the enabling signal to the closure enabling system for at least one of the enclosures so as to permit said at least one of the enclosures to be opened; and
- automatically billing the cost of the food in said at least one of said enclosures to the customer account.

2. The method of claim 1 further comprising the step of displaying for the customer said at least one of the enclosures to be opened.

3. The method of claim 2 wherein the step of identifying for the customer said at least one of the enclosures to be opened comprises:
- transmitting the customer order signal to a customer accessible display; and
- displaying a customer identification and said at least one of said enclosures at a customer accessible location so as to advise the customer of which of said enclosures in said array will contain the customer's order.

4. The method of claim 3 wherein the customer order signal includes an estimated time of arrival of the at least one food item at said at least one of said enclosures so as to permit the estimated time of arrival to be transmitted to and displayed at the customer accessible display.

5. The method claim 1 further comprising the step of issuing a customer authorization device to the customer at the restaurant.

6. The method of claim 5 wherein the customer authorization device is a debit device having an encoded value on the device which may be decremented as the device is used in the restaurant.

7. The method of claim 6 wherein the customer authorization device has a customer identification encoded therein.

8. The method of claim 5 wherein the customer authorization device is a credit device having a customer account identification encoded therein.

9. The method of claim 1 further comprising:
- transmitting the customer order signal to the food supply area so as to advise the food supply area of the customer order and said at least one of said enclosures which will be opened by the customer to fulfill the order.

10. A method of dispensing and billing for food, comprising:
- providing an array of enclosures for serving food to customers, each of the enclosures having a food supply opening through which food is inserted into the enclosure from a food supply area and a customer access opening and closure therefore through which a customer can access food in the enclosure after the closure is opened;
- providing a receiving area for a customer authorization device and a closure enabling system for each of the enclosures so as to enable the closure of each enclosure to be opened when a customer authorization device is in communication with the receiving area;
- providing an automated customer selection area for ordering food in advance of completed preparation using the customer authorization device;
- transmitting at least one signal to the food production area from the customer selection area to advise the food production area of the order;
- completing the preparation of the food ordered by the customer in food production area in response to the signal;
- supplying the food ordered to at least one of the enclosures, and
- indicating the customer which of said at least one of the enclosures containing the customer's food should be opened when the customer authorization device is in communication with the receiving area.

11. The method of claim 10 including transmitting a signal form the food supply area to an order display accessible to the customer for advising the customer of the estimated time of arrival of the order at a particular enclosure.

12. An automated food dispensing and billing system comprising:

an array of food enclosures, each food enclosure having (i) first opening for receiving food from a food supply area and second opening for dispensing the food therein to a customer, and (ii) a closure for closing at least the first opening;

a customer ordering location for permitting the customer to order at least one food item and generating customer order information for the customer including a particular food enclosure which will contain the customer's order;

a locking mechanism cooperating with each closure that normally locks the closure in a closed position and is responsive to the detection of a signal from a customer authorization device to unlock the closure and allow the closure to be opened for removal of food in the enclosure;

a billing subsystem that automatically charges an account associated with the customer authorization device when one of the closures has been opened.

13. The system of claim 12 wherein the billing subsystem charges the account based upon which closure has been opened.

14. The system of claim 12 wherein the system is a self service food system.

15. In combination with a food dispensing system of the type having an array of food enclosures, wherein each food enclosure has (i) a food supply opening for receiving food from a food supply area and (ii) a food dispensing opening for allowing food therein to be dispensed to a customer when a closure thereon has been opened, there being a mechanism that normally locks closure in a closed position, an automated, self service method of dispensing and billing for the food, comprising:

providing a customers with a customer authorization device;

taking a food order from a customer using the customer authorization device;

indicating the customer of at least one enclosure which will contain their food order;

in response to detecting a signal from the customer authorization device, actuating the mechanism to unlock the closure and allow the closure to be opened by the customer for removal of the food in the enclosure; and automatically charging an account associated with the customer authorization device by an amount that is based upon which closure has been opened.

* * * * *